W. P. HALL.
Artificial Teeth.

No. 200,284.      Patented Feb. 12, 1878.

WITNESSES

INVENTOR
Wm P. Hall,
ATTORNEYS

UNITED STATES PATENT OFFICE.

WILLIAM P. HALL, OF PIQUA, OHIO.

IMPROVEMENT IN ARTIFICIAL TEETH.

Specification forming part of Letters Patent No. 200,284, dated February 12, 1878; application filed July 10, 1877.

*To all whom it may concern:*

Be it known that I, WILLIAM P. HALL, of Piqua, in the county of Miami, and in the State of Ohio, have invented certain new and useful Improvements in Artificial Teeth; and do hereby declare that the following is a full, clear, and exact description thereof, reference being had to the accompanying drawings, and to the letters of reference marked thereon, making a part of this specification.

My invention relates to the construction of artificial teeth; and it consists in a V-shaped groove across the base, with a slight under-cut at the bottom, whereby I obtain great strength and a firm union with the rubber or celluloid, or other suitable base.

In order to enable others skilled in the art to which my invention appertains to make and use the same, I will now proceed to describe its construction and operation, referring to the annexed drawings, in which—

Figure 1:
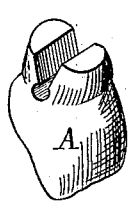
Figure 2:
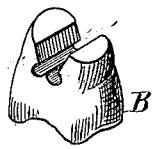
Figure 3:
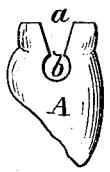
Figure 4:
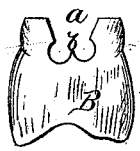

Figures 1 and 2 are perspective views of two teeth, showing different forms of my invention. Figs. 3 and 4 are side views of the teeth shown, respectively, in Figs. 1 and 2.

A and B represent two teeth, each having a V-shaped groove, *a*, across the base. At the bottom of this groove is made a slight under-cut, *b*. In teeth where the groove is narrow, as shown in the tooth A, the under-cut *b* is made single; but in teeth where the groove is made wide, as shown in the tooth B, the under-cut is made double.

When the teeth are thus constructed, and fastened, in the usual manner, in a rubber, celluloid, or other base, a firm and durable union is obtained, and the teeth rendered strong, and not liable to become broken from the base.

Having thus fully described my invention, what I claim as new, and desire to secure by Letters Patent, is—

An artificial tooth provided with a V-shaped groove across the base, with slight under-cut at the bottom, substantially as and for the purposes herein set forth.

In testimony that I claim the foregoing I have hereunto set my hand this 6th day of June, 1877.

WM. P. HALL.

Witnesses:
 WILLIS HALL,
 W. W. V. BUCHANAN.